United States Patent
Banks et al.

[11] Patent Number: 6,028,507
[45] Date of Patent: Feb. 22, 2000

[54] SECURITY SYSTEM FOR MOTOR VEHICLES

[75] Inventors: John Banks, 12538 Pavillion Ct., Houston, Tex. 77375; Michael J. Payne, Houston, Tex.

[73] Assignees: John Banks; Michael Payne, both of Houston, Tex.

[21] Appl. No.: 09/280,526

[22] Filed: Mar. 30, 1999

[51] Int. Cl.[7] .................................................. B60R 25/10
[52] U.S. Cl. .......................... 340/427; 340/426; 340/428; 307/10.3
[58] Field of Search ................................ 340/425.5, 426, 340/427, 428, 430; 307/10.2, 10.3; 180/287

[56] References Cited

U.S. PATENT DOCUMENTS

| | | | |
|---|---|---|---|
| 3,673,562 | 6/1972 | Buell | 340/432 |
| 3,728,675 | 4/1973 | Horn et al. | 340/427 |
| 4,006,452 | 2/1977 | Giacino | 340/427 |
| 4,188,614 | 2/1980 | Habib, Jr. | 340/427 |
| 4,276,540 | 6/1981 | Habib | 340/427 |
| 4,315,244 | 2/1982 | Cole, Jr. | 340/427 |
| 4,641,124 | 2/1987 | Davis | 340/426 |
| 5,124,565 | 6/1992 | Yoshida et al. | 307/9.1 |

*Primary Examiner*—Daryl Pope
*Attorney, Agent, or Firm*—Wendy K. Buskop; Bayko Gibson et al.

[57] ABSTRACT

A security system for use on a motor vehicle having a manufacturer's electrical ignition system, wherein the security system comprises electronic means for controlling the security system; a sensing means for sensing tampering; at least one warning means; at least one immobilizing means, wherein the electronic means receives electronic sensor signals from the sensing means and sends electronic activation signals to the warning means and to the immobilizing means; potting means disposed upon the electronic means for excluding moisture, heat and vibration from the electronic means; and a remote-control means for remotely controlling the security system, which remote-control means is resistant to scanning-type interference, and wherein the remote-control means further comprises: a receiving means for receiving radio control signals, and a transmitting means for transmitting a multiplicity of radio control signals, wherein said transmitting means further comprises at least: signals for changing the sensitivity of the sensing means, signals for activating and deactivating the electronic means, and signals for immediate activation of the warning means. The security system wherein the connective means comprises conductive wire with a layer of insulation disposed thereon wherein the insulation is black. The security system wherein the connective means is manufactured to fit the manufacturer's original factory wiring system.

26 Claims, 5 Drawing Sheets

SECURITY SYSTEM FOR MOTOR VEHICLES

BACKGROUND OF INVENTIONS

The present invention relates to security systems for motor vehicles. More specifically the present invention relates to improved features for ease of installation, owner's convenience of use, reliability of physical components, and effectiveness in preventing thefts of vehicles.

Theft of motor vehicles, especially motorcycles, has been and continues to be a serious problem for owners of such vehicles. Thieves are increasingly sophisticated, and owners are increasingly concerned to have security systems that are reliable and convenient.

The objects of the current invention therefore are to provide a security system for motor vehicles that will be sensitive to indications of theft, difficult for thieves to detect or disable, resistant to false alarms, rugged and reliable with respect to heat, moisture, and vibration, easy to install.

All security is a tradeoff between safety and convenience. Motor vehicles stored in bank vaults are safe but inconvenient to use. It is therefore a further an object of the present invention to provide a high degree of security against theft of motor vehicles while at the same time providing a high degree of convenience of use for the owner of the vehicle.

SUMMARY

The present invention provides sensitivity to indications of theft through use of a shock sensor which is electrically coupled to electronic circuitry that provides adjustable sensitivity to physical tampering with the motor vehicle. The sensitivity is adjusted by remote control effected through use of a transmitter carried in possession of the owner and a receiver mounted on the motor vehicle and electrically coupled to the electronic circuitry, providing control signals for electronically adjusting sensitivity. The use of the variable sensitivity also renders the invention safe from false alarms because the owner can set the sensitivity to a level high enough to eliminate false alarms but low enough reliably to detect improper tampering with the motor vehicle.

Moreover, the use of a shock sensor with adjustable electronic sensitivity provides a high degree of affirmative control over resistance to false alarms, much more affirmative control over resistance to false alarms than can be had by use of perimeter alarms or proximity alarms or mercury tilt switches.

The invention is rendered difficult for thieves to detect or disable through use of an integral connective means, implemented typically as a wiring harness, that is designed and manufactured specifically to fit alongside the ignition wiring of the vehicle's manufacturer and is colored all the same color, not color-coded, so that it is practically impossible for a thief to discover, analyze, and disable the wiring for the security system of the invention. In addition, the invention is further rendered difficult for thieves to discover, analyze and disable by so configuring the wiring harness that it enables the individual components of the invention to be located and distributed about the frame or body of the motor vehicle in a manner that upon visual inspection by a thief indicates no particular relationship among them.

The invention is made rugged and reliable with respect to heat, moisture and vibration by use of potting material poured in liquid form over the electronic components of the electronic control circuitry and over the electronic components of the remote control receiver, then allowed to harden. The hardened potting material seals the electronic components within the hardened material, providing a high degree of protection against heat, vibration, and moisture.

The invention is made easy to install by providing electrical connectors affixed to the connective means or wiring harness, which electrical connectors are of the same kind used by the manufacturer of the motor vehicle in the vehicle's ignition wiring. The invention is further made easy to install by implementing the electronic circuitry for controlling the security system separately from the remote control receiver and separately from a pager transmitter that can be provided to alert the owner of tampering, so that all such components can be distributed about the body or frame of the motor vehicle so that they can be installed in any small space that is convenient for them. This quality of the connective means or wiring harness, that it can be implemented to support the components of the security system distributed in an unrelated manner about the frame or body of the vehicle, also has the benefit, noted above, of making the security system more difficult for thieves to identify, analyze, and disable.

The security system that is the subject of the present invention implements a high degree of security by providing one or more means of immobilizing the motor vehicle. The means of immobilizing the motor vehicle can comprise electronically grounding the secondary of the manufacturer's ignition coil. Such grounding of the secondary of the ignition coil can be accomplished through use of an electronic relay with its switch contacts normally closed, so that removing electric power from the system leaves the secondary of the ignition coil shorted to ground, thus making the electronic default condition one in which the motor vehicle is immobilized, thus providing a high degree of security.

The means of immobilizing the motor vehicle can further comprise severing from its source of electric power the manufacturer's ignition control module. Severing the ignition control module from its source of electric power can be accomplished through the use of electronic relays configured with their switching contacts normally open, so that removing electric power from the system leaves the secondary of the ignition coil open, effectively interrupting delivery of electric power to the ignition control module, thus making the electronic default condition one in which the motor vehicle is immobilized, thus providing a high degree of security.

The security system of the present invention further implements a high degree of security by providing a pager that is activated by the electronic controls whenever the electronic controls in conjunction with the shock sensor detect improper tampering with the motor vehicle. The pager can be configured so that it pages the owner immediately upon activation so that the owner can return quickly to the vehicle to discourage thieves. If the owner of the vehicle is too far away to return personally, the owner can telephone for help from neighbors or the police, thus providing a high degree of security even when the owner is too far away personally to intervene.

The security system of the present invention further implements a high degree of security by providing control of the system only remotely, through a remote control transmitter, thereby providing no physical switches or keys to be used by thieves as starting points in attacking the security system, thus rendering the present invention even more secure.

The security system of the present invention is made convenient to use by providing an active remote control for arming and disarming the security system. The remote control can be configured so that arming the security system is accomplished only actively, thus eliminating the annoying false alarms associated with, for example, leaving for repairs a vehicle with a system that passively arms automatically after the vehicle ignition in switched off. Instead, the owner can leave the vehicle for repairs with the security system disarmed without concern that the alarm will be triggered inappropriately.

BRIEF DESCRIPTION OF THE DRAWINGS

The invention can be further understood from the Figures.

DESCRIPTION OF THE INVENTION

Figure 1:
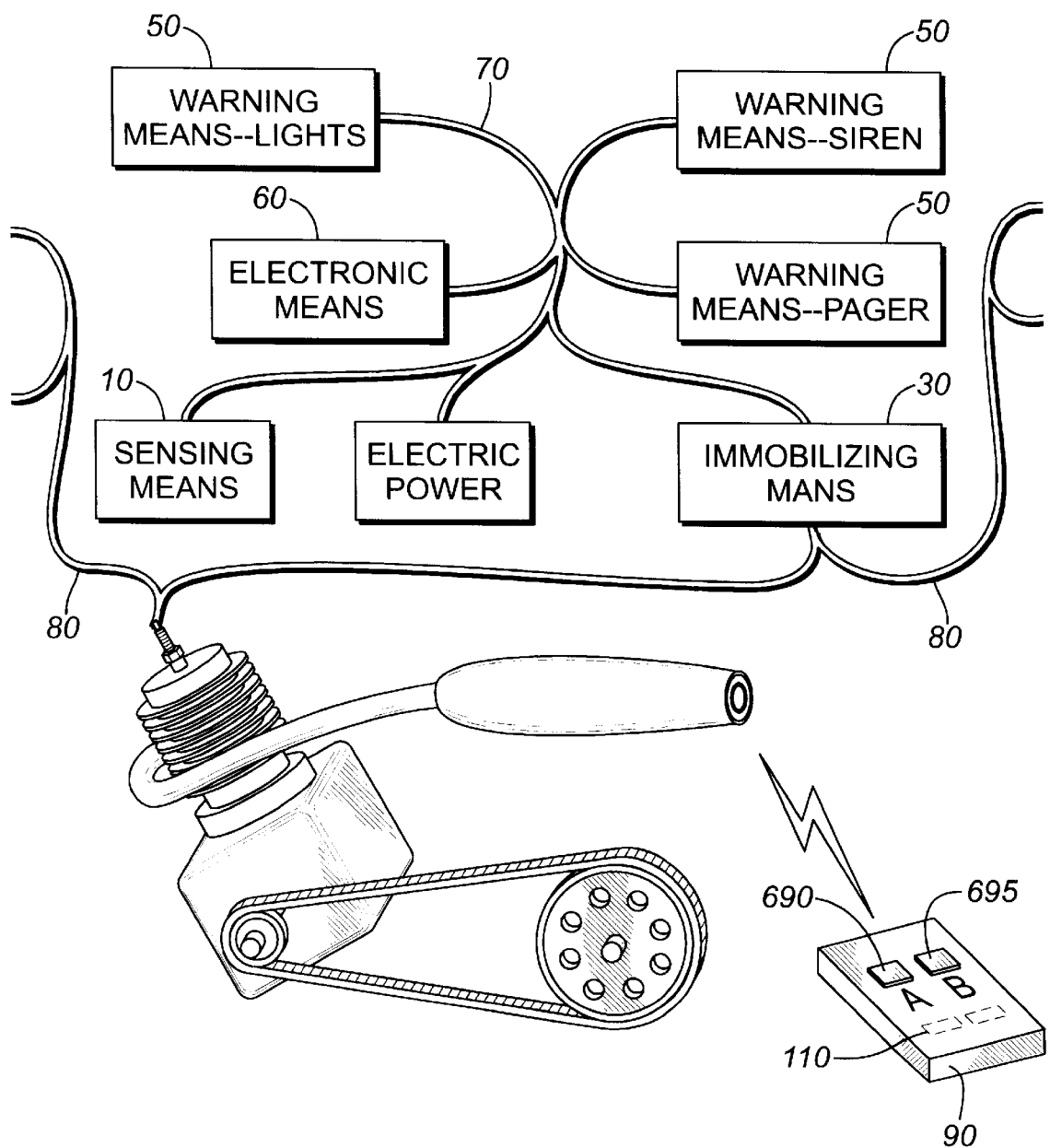
FIG. 1 is a block diagram showing relations among elements of the invention.

Referring to the embodiment of the invention as show in the drawings, where corresponding parts are indicated by corresponding numerals, the present invention relates to a security system for motor vehicles in which the security system comprises sensing means 10 for sensing tampering with a motor vehicle, electronic means 60 for controlling the security system, potting means 40, at least one warning means 50, and at least one immobilization means 30, connective means 70 for electrically coupling the parts of the security system, and remote control means 90.

The sensing means 10 comprises means for detecting tampering with the motor vehicle. The sensing means 10 is electrically coupled through the connective means 70 to the electronic means 60. The sensing means 10, upon sensing tampering with the motor vehicle provides electronic sensor signals to the electronic means 60.

The electronic means 60 provides the overall control function for the security system. The electronic means 60 is electrically coupled to the sensing means 10, to the warning means 50, and to the immobilizing means 30. The electronic means 60 receives electronic sensor signals from the sensing means 10 and sends electronic activation signals to the warning means 50 and to the immobilizing means 30.

The potting means 40 comprises an epoxy resin, initially liquid, that is poured onto the electronic means and allowed to harden. After hardening, the potting means 40 provides for the electronic means 60 rugged protection against moisture, vibration, and heat. The potting means 40 is disposed both upon the electronic means 60 and also upon the internal electronics components 110 of the remote control means.

The warning means 50 is electrically coupled to the electronic means 60. The warning means 50 is activated by the electronic 60 means when the electronic means 60 receives the electronic sensor signals from the sensing means 10.

The immobilization means 30 is electrically coupled to the electronic means 60. The immobilization means 30 is activated by the electronic means 60 when the electronic means 60 receives the electronic sensor signals from the sensing means 10.

The connective means 70 electrically couples the sensing means 10 to the electronic means 60, the electronic means 60 to the warning means 50, the electronic means to the immobilization means 30, and the electronic means 60 to the motor vehicles manufacturer's electrical ignition system 80.

The security system is controlled by a remote control transmitter 90 and receiver 290 which are resistant to scanning-type interference, and which provide control signals for changing the sensitivity of the sensing means, activating and deactivating the security system, and immediate activation and deactivation of the warning means.

Figure 7:
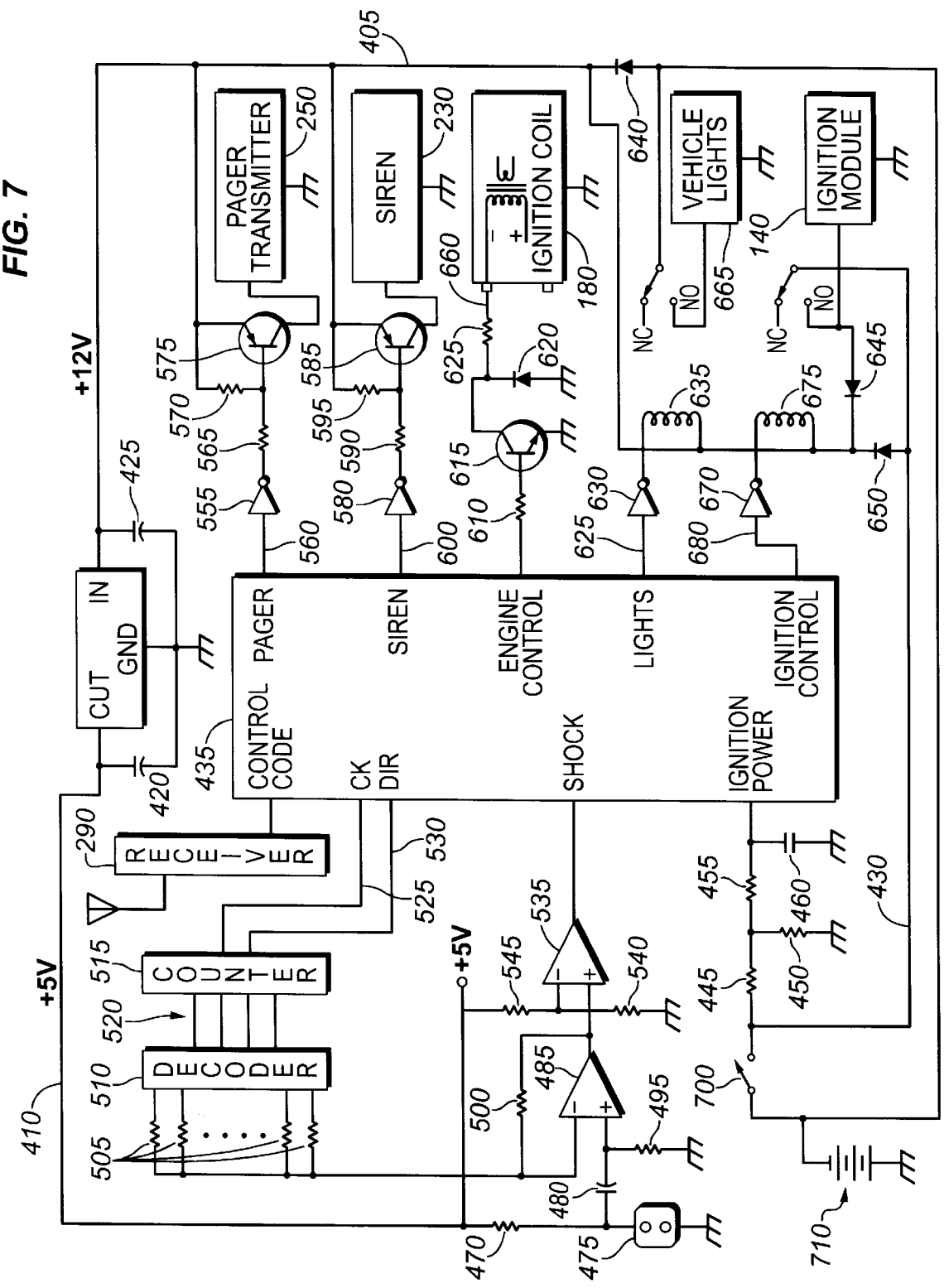
FIG. 7 is an electrical schematic diagram of the security system.

In the preferred embodiment, there are two sensing means, a first sensing means called a "shock sensor" 475 for detecting physical motion of the vehicle, and a second sensing means for detecting tampering with the vehicle's ignition. The shock sensor 475 is a device known in the art, in a preferred embodiment, a shock sensor 475 as manufactured by Astro General Corporation. The shock sensor 475 operates by varying its electrical resistance in response to physical motion. When electric current is supplied to the shock sensor 475 as through resistor 470 as shown in FIG. 7, changes in the resistance of the shock sensor 475 can be coupled as voltage changes to a electronic circuitry such as operational amplifier 485. Any physical motion of the shock sensor 4715, even the tiniest vibration, causes detectable changes in the electric potential present across the shock sensor 475. The shock sensor 475 is sensitive to changes in the position of the vehicle. The shock sensor 475 is even sensitive to vibration caused by wind or conducted through the ground from neighboring sources of vibration such as engines of other vehicles idling or passing nearby. The shock sensor 475 is so sensitive that it requires means for adjusting sensitivity so that the vehicle owner can leave the vehicle with the security system armed, confident that the shock sensor 475 will detect improper tampering, without annoying false alarms.

The sensing means for detecting tampering with the vehicle's ignition system 80 is an ignition tampering sensor 120 integrated within the electronic means 60. The ignition tampering sensor 120 activates the security system 130 upon detecting any application of voltage to the ignition system 80 while the security system 130 is armed. Such applications of voltage can arise from attempts to hot wire the vehicle as well as simply turning on the vehicle's ignition switch, with or without an ignition key, at any time when the security system 130 is armed.

The warning means in the preferred embodiment comprises a siren 230, flashing lights 240, and a pager 250–260. The siren 230 is a small, loud siren of a kind known in the art, capable of producing sound pressure levels in excess of 100 decibels. The siren 230 is connected through the connective means to the electronic means 60. Each time the alarm is activated, the electronic means 60 causes the siren to sound for about thirty seconds.

The flashing lights 240 are the running lights of the vehicle. The flashing lights are connected through the connective means 70 to the electronic means 60. Each time the alarm is activated, the electronic means 60 causes the flashing lights 240 to flash for about thirty seconds.

Figure 2:
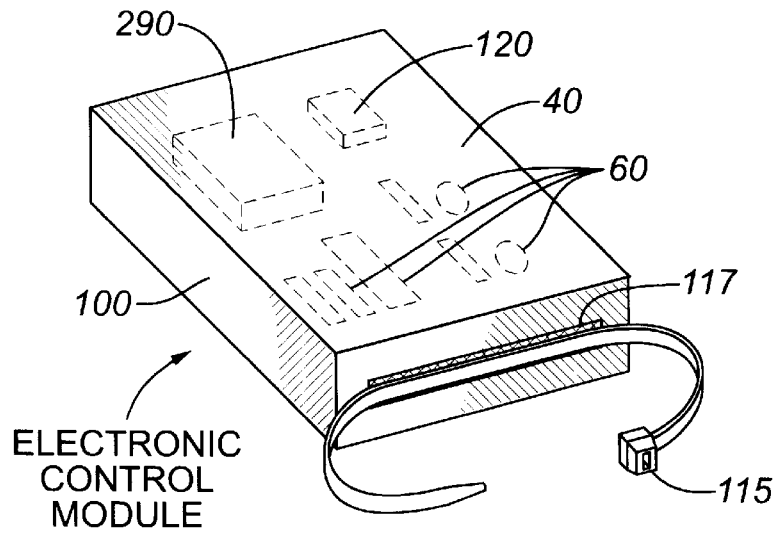
FIG. 2 is perspective view of the electronic control module housing.
Figure 3:
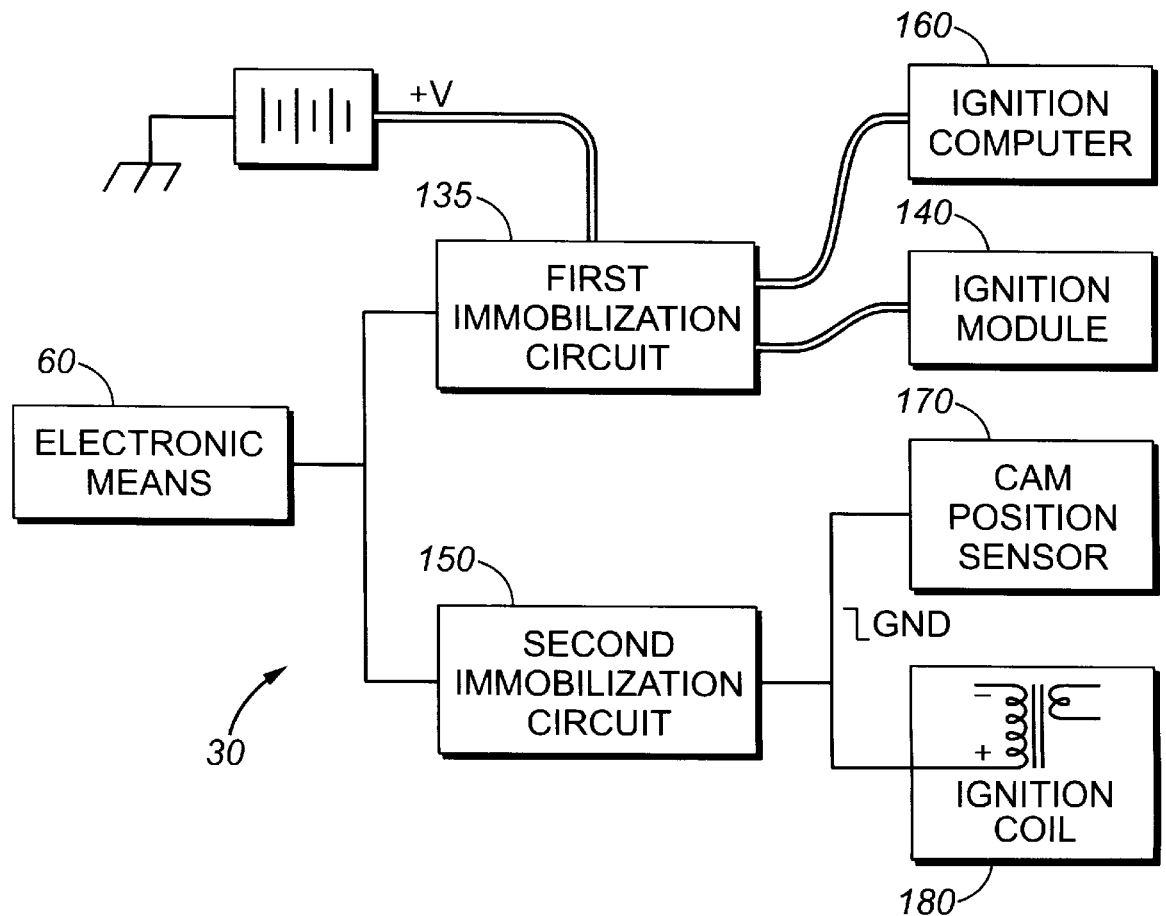
FIG. 3 is a block diagram showing the immobilization means.
Figure 4:
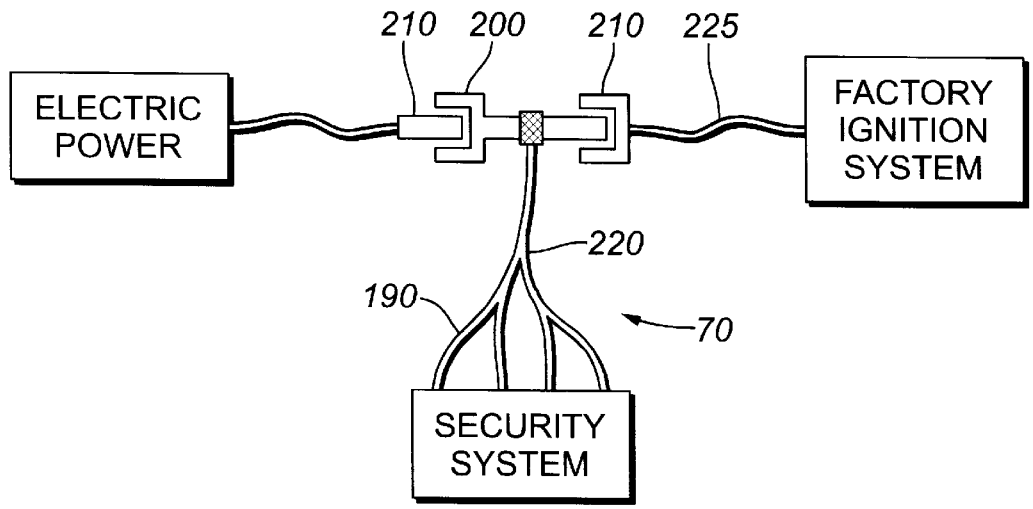
FIG. 4 is a front view of the plug connection between the security system and the vehicle's ignition system.
Figure 5:
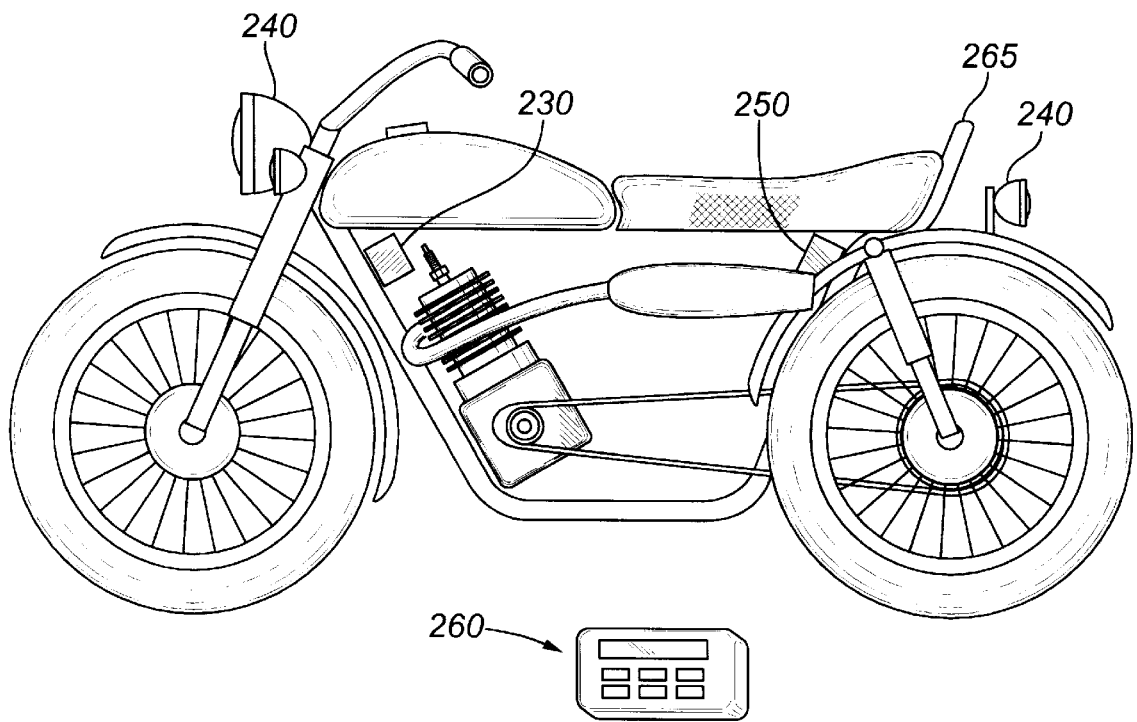
FIG. 5 is a side view of a motor vehicle showing a preferred embodiment of the warning means.
Figure 6:
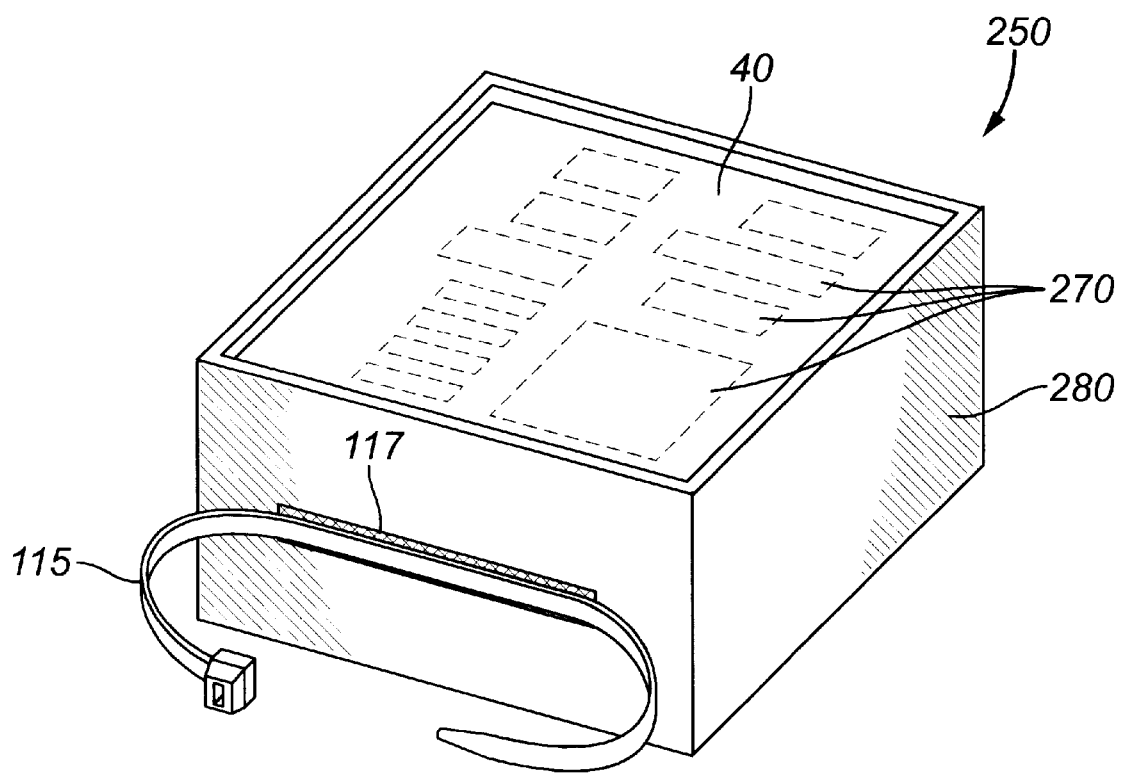
FIG. 6 is a perspective view of the pager transmitter housing.

The pager comprises a pager transmitter 250 and a pager receiver 260. The pager is of a kind know in the art. The pager transmitter 250 comprises electronic components 270 mounted within a pager transmitter housing 280. Potting material 40 is disposed upon the pager transmitter's electronic components 270, shown in FIG. 6, in a manner similar to the disposal of the potting 40 upon the electronic means, shown in FIG. 2. The pager transmitter 250 is connected electrically through the connective means 70 to the electronic means 60. Each time the alarm is activated, the electronic means 60 causes the pager transmitter 250 to transmit a pager message to the pager receiver 260.

The immobilization means 30 in the preferred embodiment comprises two electronic circuits. The first immobilization circuit 135 when activated by the electronic means, immobilizes the vehicle by interrupting the positive feed of electric power to the factory ignition module 140 or, on more modern vehicles, to the factory ignition computer module 160. The second immobilization circuit 150 when activated by the electronic means, immobilizes the vehicle by grounding the cam position sensor 170 or by grounding the ignition coil 180.

The connective means 70 will be in most embodiments a wiring harness, comprising a multiplicity of conductive wires 190 with electrically conductive plugs 200 on the ends of the wires, which plugs are compatible with the manufacturer's ignition wiring plugs 210. The connective means 70 also comprises wiring insulation 220 all of the same color on all of the wires in the harness. In the preferred embodiment, the color of the wiring insulation is black.

The remote control means comprises a remote control transmitter 90 and a remote control receiver 290. Both are of a kind known in the art. The remote control transmitter 90 is capable of transmitting, and the remote control receiver 290 is capable of receiving, radio control codes representing the functions of arming and disarming the security system, increasing and decreasing shock sensor sensitivity, and immediate activation of the warning means.

The remote control receiver 290 is physically integrated with the electronic means 60 in the electronic control module housing 100. The remote control transmitter 90 is carried by the vehicle owner.

The electronic means as shown in FIG. 7 can be provided with two voltage levels. Twelve volts can be provided by a connection to the motor vehicle battery at line 405, and five volts can be provided at line 410 from the output connection of the voltage regulator 415. Capacitors 420 and 425 are connected respectively to lines 410 and 405 as filter capacitor for removal of alternating current from the supply of direct current provided on lines 410 and 415.

The twelve volt direct current supply can be connected also from the motor vehicle ignition switch to line 430 as an indication to the microprocessor that the ignition is on. The twelve volts on line 430, when present, is reduced to about five volts at tap point 440 by the voltage divider formed by resistors 445 and 450. Resistor 455 and capacitor 460 connected at tap point 465 can provide additional filtering of alternating current.

Current is provided through resistor 470 to shock sensor 475. Voltage variations from current changes in the sensor are coupled through capacitor 480 to the positive input of operational amplifier 485 at tap point 490. The direct current potential of tap point 490 is set to ground by resistor 495. The gain of operational amplifier 485, and therefore the sensitivity of the security system to physical tampering, is set by resistor 500 in conjunction with the array of 16 resistors 505. One of the sixteen resistors in array 505 can be connected to ground potential by the decoder. The decoder 510 decodes the four line binary input 520 from binary counter 515 into a one-of-sixteen output format to connect to ground one of the sixteen resistors in array 505 thus selecting one of sixteen gain levels for operational amplifier 485 and one of sixteen sensitivity levels for the security system. The resistors in the array can be arranged in order of decreasing electrical resistance so the selecting them in order will cause the gain of operational amplifier 485 to increase accordingly. If the resistor selected from the array 505 is designated R1 and the resistor 500 is designated R2, then the gain of the operational amplifier 485 can be described by the expression: (R1+R2)/R1.

The four bit binary code implemented at the four line binary input 520 from binary counter 515 can be set under microprocessor control through control lines 525 and 530. Line 525 can be used to clock the counter 515, and line 530 can be used to control the direction of the count, up or down, thus increasing or decreasing the gain of operational amplifier 485 and increasing or decreasing the sensitivity of the security system to physical tampering.

Operational amplifier 535 is configured as a comparator with its comparison voltage set by the voltage divider comprising resistors 540 and 545. The output of operational amplifier 535 at tap point 550 therefore indicates to the microprocessor, for any particular setting of gain and sensitivity determined by the present state of counter 515 and decoder 510, whether the shock sensor 475 has been sufficiently agitated to justify triggering the security system.

The microprocessor 435 can be connected to the pager transmitter 250 through inverter 555 and transistor 575. Transistor 575 can be used to provide more current than can be sunk by the pager output 560 of the microprocessor 435. Transistor 575 is biased through the voltage divider comprising resistors 565 and 570 to function as a solid state switch, applying or removing the electric power supply for operation of the pager transmitter 250.

The microprocessor 435 can be connected to the siren 230 through inverter 580 and transistor 585. Transistor 585 can be used to provide more current than can be sunk by the siren output 600 of the microprocessor 435. Transistor 585 is biased through the voltage divider comprising resistors 590 and 595 to function as a solid state switch, applying or removing electric power for operation of the siren 230.

The microprocessor 435 can be connected to the negative side of the ignition coil secondary 180 through transistor 615. Resistor 610 provides bias current to operate transistor 615 as a solid state switch when activated by the engine control output 605 of the microprocessor 435. When transistor 615 is activated, the voltage level at tap points 655 and 660 can be brought to approximately ground potential thus disabling the normal ignition operation of the ignition coil 180. Resistor 625, with a resistance of a few ohms, can be provided between the transistor 615 and the ignition coil 180 to limit the maximum current that can be drawn through the ignition coil 180 to avoid damaging the ignition coil 180. Diode 620 can be provided to protect against inductive kick from the ignition coil 180 when transistor 615 is switched off.

The microprocessor 435 can be connected to the vehicle lights through inverter 630 and relay 635. The relay 635 can provide more current to the lights than could be provided directly from the light control output 625 of the microprocessor 435. Diode 640 can be provided to protect against inductive kick from relay 635 when it is switched off.

The microprocessor 435 can be connected to the vehicle's ignition module 140 through inverter 670 and relay 675. The relay 675 can provide more current to the ignition module 140 than could be provided directly from the ignition control output 680 of the microprocessor 435. Diodes (640, 545 and 650) are provided to protect against inductive kick from relays 635 and 675 when the relays are switched off.

The remote control receiver 290 can be connected to the microprocessor 435 at tap point 685, the control code input to the remote control receiver 290.

The microprocessor 435 operates according to a control program stored in non-volatile memory such as a read only memory ("ROM") as known in the art. The ROM can be implemented upon the microprocessor 435 or upon a separate integrated circuit chip (not shown) then connected to the microprocessor 435 by appropriate means.

Considering now the operation of the security system, the user can arm the system by pressing button A 690 on the remote control transmitter 90. The remote control transmitter 250 then transmits the arming code to the remote control receiver 290 which provides the code in serial form to the control code input 685 of the microprocessor 435. The microprocessor then can change states in accordance with its control program to activate the microprocessor outputs for the engine control 605 and the ignition control 680, thus disabling the ignition coil 180 and the ignition module 140.

While the security system is armed, application of ignition voltage, approximately twelve volts, to line 430 will cause the microprocessor in accordance with its control program to: (1) activate its pager output 560 and therefore the pager transmitter 250, (2) activate its siren output 600 and therefore the siren 230, and (3) activate the light control output 625 and therefore flash the lights of the motor vehicle. Ignition voltage can be applied to line 430 by attempts to hot wire the vehicle or by operation of the ignition key without first disarming the security system.

While the security system is armed, any physical motion or vibration sufficient in intensity to cause activation of the shock sensor input 550 of the microprocessor through the operational amplifiers 485 and 535 will cause the microprocessor in accordance with its control program: (1) activate its pager output 560 and therefore the pager transmitter 250, (2) activate its siren output 600 and therefore the siren 230, and (3) activate the light control output 625 and therefore flash the lights of the motor vehicle.

The user can disarm the system by pressing button B 695 on the remote control transmitter 90. The remote control transmitter 250 then transmits the disarm code to the remote control receiver 290 which provides the code in serial form to the control code input 685 of the microprocessor 435. The microprocessor then can change states in accordance with its control program to activate the microprocessor outputs for the engine control 605 and the ignition control 680, thus enabling the ignition coil 180 and the ignition module 140.

While the security system is disarmed, the user can change the security system to sensitivity-setting mode by holding down for one second simultaneously both button A 690 and button B 695 on the remote control transmitter 110. The remote control transmitter 250 can then transmit the sensitivity-setting mode code to the to the remote control receiver 290 which then can provide the code in serial form to the control code input 685 of the microprocessor 435. The microprocessor then in accordance with its control program can treat the codes immediately next following as sensitivity setting codes.

While the security system is in the sensitivity-setting mode described just above, the user can change the sensitivity of the security system to physical tampering by pressing button A 690 to increase sensitivity or button B 695 to decrease sensitivity. When the user presses button A 690, the remote control transmitter 110 transmits the sensitivity increase code to the remote control receiver 290 which receiver can then provide the sensitivity increase code in serial form to the control code input 685 of the microprocessor 435. The microprocessor then in accordance with its control program can cause the voltage level of the direction control line 530 to be set to increment the counter 515. The microprocessor then can cause a clock pulse to be delivered across clock line 525 incrementing the counter which increments the binary number represented on the binary counter output lines 520, which causes the decoder 510 to select the resistor in array 505 having the next lower value of electrical resistance, thus increasing accordingly the gain of operational amplifier 485 and the sensitivity of the security system.

While the security system is in the sensitivity-setting mode, when the user presses button B 690, the remote control transmitter 110 can transmit a sensitivity decrease code to the remote control receiver 290 which receiver can then provide the sensitivity decrease code in serial form to the control code input 685 of the microprocessor 435. The microprocessor then in accordance with its control program can cause the voltage level of the direction control line 530 to be set to decrement the counter 515. The microprocessor then can cause a clock pulse to be delivered across clock line 525 decrementing the counter which decrements the binary number represented on the binary counter output lines 520, which causes the decoder 510 to select the resistor in array 505 having the next higher value of electrical resistance, thus reducing accordingly the gain of operational amplifier 485 and the sensitivity of the security system.

While the security system is in the sensitivity-setting mode, the use can remove the sensitivity-setting mode and return the alarm to the disarmed condition by again holding down simultaneously for one second button A 690 and button B 695. The remote control transmitter 250 can then transmit the sensitivity-setting mode code to the to the remote control receiver 290 which then can provide the code in serial form to the control code input 685 of the microprocessor 435. The microprocessor then in accordance with its control program can remove the alarm from sensitivity-setting mode, returning the security system to the disarmed condition.

In the preferred embodiment, the components of the electronics means have the qualities and characteristics described below.

The operational amplifier 485 and operational amplifier 535 are general-purpose operational amplifiers such as those available from several manufacturers and commonly designated, for example, as models UA741 or LM358.

Resistor 470 is one-quarter watt, 3.3 kilohms.
Resistor 495 is one-quarter watt, 100 kilohms.
Resistor 500 is one-quarter watt, 1 megohm.
Resistor 540 is one-quarter watt, 10 kilohms.
Resistor 545 is one-quarter watt, 39 kilohms.
Resistor 445 is one-quarter watt, 1.5 kilohms.
Resistor 450 is one-quarter watt, 1 kilohm.
Resistor 455 is one-quarter watt, 220 kilohms.
Resistor 565 is one-quarter watt, 470 ohms.
Resistor 570 is one-quarter watt, 2.2 kilohms.
Resistor 590 is one-quarter watt, 470 ohms.
Resistor 595 is one-quarter watt, 2.2 kilohms.

Resistor 610 is one-quarter watt, 2.7 kilohrns.
Resistor 625 is one-quarter watt, 6.8 ohms.
Resistor 595 is one-quarter watt, 2.2 kilohms.
Resistor 595 is one-quarter watt, 2.2 kilohms.
Resistor 595 is one-quarter watt, 2.2 kilohms.

The sixteen resistors of array 505 can have any values that provide optimum gain settings for a preferred embodiment.

The decoder 510 is known in the art as an integrated circuit for implementing a standard four-binary-line to one-of-sixteen decoding function.

The binary counter 515 is known in the art as an integrated circuit for implementing a standard sixteen-state binary counter.

The capacitor 460 is 0.1 microfarads.

The voltage regulator 415 is of the kind known in the industry, a general-purpose, medium-power voltage regulator, and for example commonly referred to by the designation "LM7805."

The inverters (555, 580, 630 and 670) are comprised of a kind known in the industry as an integrated circuit implementing several logical inverters, typically six of them.

The diodes 620, 640, 645, and 650 are common medium power semiconductor diodes.

The transistors 575 and 585 are common PNP-type, medium power transistors capable of switching sufficient current to power the pager transmitter 250 and the siren 230.

The transistor 615 is a common NPN-type, medium power transistor capable of switching sufficient current to ground the secondary of the ignition coil 180.

The relays 635 and 675 are common electrical relays capable of conducting sufficient current to power the vehicle lights 665 and the ignition module 140.

In a preferred embodiment, the electrical plugs 200 are of the Deutch manufacture, commonly supplied as factory equipment on Harley-Davidson motorcycles.

In a preferred embodiment, the pager transmitter module housing 280 can be affixed to the frame of the motor vehicle 265 by use of plastic ties 115 which can be secured to the pager transmitter module housing 280 by an adhesive 117 disposed between the plastic ties 115 and the pager transmitter module housing 280.

In a preferred embodiment, the electronic control module housing 100 can be affixed to the frame of the motor vehicle 265 by use of plastic ties 115 which can be secured to the electronic control module housing 100 by an adhesive 117 disposed between the plastic ties 115 and the electronic control module housing 100.

In normal operation of the security system, the user brings the motor vehicle to rest, steps away from the vehicle and uses the remote control transmitter 90 to arm the security system. The user arms the security system only by use of the remote control transmitter 90. In the preferred embodiment, there is no arming switch or arming key, only the remote control transmitter 90 can arm the security system. When the security system is armed, any physical impact on the vehicle that exceeds the sensitivity setting of the shock sensor 475 will trigger the siren 230, the flashing lights 665, and the pager transmitter 250. When the alarm is armed, any application of voltage to the ignition system will trigger the siren 230, the flashing lights 665, and the pager transmitter 250.

The present invention provides the advantages of reliability through potting with compounds that are waterproof and resistant to shock and heat. The invention achieves such reliability by use of a rugged potting material 40 poured over and hardened upon the electronic components of the electronic means 60 and the pager transmitter 250. The invention satisfies the need for remote warning of the vehicle owner by utilizing a built-in pager transmitter 250 to automatically page the vehicle owner whenever the vehicle is tampered with.

The invention is resistant to disablement by thieves. The invention achieves this resistance by providing a connective means implemented as a wiring harness 70 that, unlike the harnesses in the prior art, is not color-coded. The insulation 220 on all the wires in the harness of the preferred embodiment of the invention are the same color, preferably black, which renders the wiring of the invention practically impossible for thieves to analyze and disable. In addition, the invention provides a wiring harness 70, plug compatible with the manufacturer's ignition wiring, installed alongside the vehicle manufacturer's original ignition wiring, so that it is practically impossible for thieves to distinguish the security system wiring harness 70 from the ignition system wiring 225.

The present invention achieves ease of installation by providing a wiring harness 70 compatible with the manufacturer's ignition harness 225, so that the security system wiring harness 70 can be installed non-destructively, merely by plugging it directly into the manufacturer's existing plugs 210 in the manufacturer's ignition system of the motor vehicle, with no need for soldering or crimping.

The invention avoids the problems associated with passive arming, by providing exclusively active arming. Arming the security system of the present invention in its preferred embodiment requires an affirmative use of the remote control transmitter. Therefore the security system in the present invention is never activated unintentionally.

The security system of the present invention is made even more difficult for thieves to identify, analyze and disable by provision of control in remote form only. There are no controls on the vehicle, no keys, buttons, or switches, to give thieves a starting point in working to disable the alarm. Because all control is accomplished remotely, there is no need for elements of the alarm to have any particular physical relationship to one another. The elements can be distributed at unexpected locations anywhere on the motor vehicle consistent with space available for them, thus rendering the alarm even more difficult for thieves to identify, analyze and disable. The remote control transmitter used to control the alarm employs anti-scanning technology that renders the transmitter extremely resistant to tampering or interference from thieves.

Although the present invention has been described in considerable detail with reference to certain preferred versions thereof, other versions are possible. For example, although the preferred embodiment of the security system upon sensing tampering triggers the siren, the flashing lights, and the pager, a useful alternative embodiment could configure the control program of the microprocessor to activate the pager without activating the siren or the flashing lights, thus giving the owner an opportunity to phone the police or to intervene personally without previously alerting a thief.

Although the preferred embodiment as shown in the drawings uses adhesive to secure the plastic ties to the module housings, alternative means can be employed, such as staples, braids, or heat fusion of the plastic tie material to the housing material.

Although the preferred embodiment is described as having sixteen sensitivity settings, alternative embodiments could implement any useful number of sensitivity settings.

Because the present invention can comprise alternatives such as those just discussed as examples, the spirit and scope of the appended claims should not be limited to the description of the preferred versions set forth herein.

What is claimed is:

1. A device for use on a motor vehicle with a manufacturer's electrical ignition system, wherein the device comprises:

electronic means for controlling the device, wherein the electronic means is electrically coupled: to at least one sensing means, at least one warning means, and at least one immobilizing means, and wherein the electronic means receives electronic sensor signals from the at least one sensing means and sends electronic activation signals to the warning means and to the immobilizing means;

potting means for excluding moisture, heat and vibration from the electronic means, wherein the potting means is disposed upon the electronic means;

said at least one sensing means comprising means for detecting tampering with the motor vehicle, and wherein the at least one sensing means is electrically coupled to the electronic means, and wherein the at least one sensing means upon sensing tampering with the motor vehicle provides said electronic sensor signals to the electronic means;

said at least one warning means comprising means for electrically coupling to the electronic means, and wherein the at least one warning means is activated by the electronic means when the electronic means receives the electronic sensor signals from the at least one sensing means;

said at least one immobilizing means electrically coupled to the electronic means, wherein the immobilization means is activated by the electronic means when the electronic means receives the electronic sensor signals from at least one sensing means;

connective means that electrically couples: the at least one sensing means to the electronic means, the electronic means to the warning means, the electronic means to the immobilization means, and the electronic means to the motor vehicle manufacturer's electrical ignition system; and remote-control means for remotely controlling the device, which remote-control means is resistant to scanning-type interference, and wherein the remote-control means further comprises: a receiving means for receiving radio control signals, and a transmitting means for transmitting a multiplicity of radio control signals, wherein said transmitting means further comprises at least: signals for changing the sensitivity of the at least one sensing means, signals for activating and deactivating the electronic means, and signals for immediate activation of the warning means.

2. The device of claim 1 wherein the connective means comprises conductive wire with a layer of insulation disposed thereon wherein the insulation is black.

3. The device of claim 1 wherein the motor vehicle is a motorcycle and the connective means is manufactured to fit the manufacturer's original factory wiring system for a motorcycle.

4. The device of claim 1 wherein the electronic means deactivates the warning means and the immobilization means thirty seconds after activating them.

5. The device of claim 1 wherein the warning means comprises a small siren capable of producing a warning sound, with sound levels in excess of 100 decibels.

6. The device of claim 1 wherein the warning means is selected from among the group comprising:

at least one audible warning comprising a small siren that produces a warning sound, in excess of 100 decibels, and can be installed within a motor vehicle in locations difficult to access, from which the siren is difficult to remove;

at least one visual warning means comprising at least one bright flashing light; and a remote warning means, comprising a pager that upon activation, pages the owner of the motor vehicle.

7. A security system for a motor vehicle having a manufacturer's electrical ignition system comprising at least an ignition coil and an ignition control module, which security system comprises:

electronic means for controlling the device, wherein the electronic means is electrically coupled: to at least one sensing means, at least one warning means, and at least one immobilizing means, and wherein the electronic means receives electronic sensor signals from the at least one sensing means and sends electronic activation signals to the warning means and to the immobilizing means;

potting means for excluding moisture, heat and vibration from the electronic means, wherein the potting means is disposed upon the electronic means;

said at least one sensing means comprising means for detecting tampering with the motor vehicle, wherein the at least one sensing means is electrically coupled to the electronic means, wherein the at least one sensing means upon sensing tampering with the motor vehicle provides said electronic sensor signals to the electronic means, and wherein the at least one sensing means adjusts its sensitivity to security risks in response to a radio control signal transmitted from a remote control means;

said at least one warning means electrically coupled to the electronic means, wherein the warning means is activated by the electronic means when the electronic means receives the electronic sensor signals from the at least one sensing means;

said at least one immobilizing means electrically coupled to the electronic means, wherein the immobilization means is activated by the electronic means when the electronic means receives the electronic sensor signals from the at least one sensing means;

connective means that electrically couples: the at least one sensing means to the electronic means, the electronic means to the warning means, the electronic means to the immobilization means, and the electronic means to the motor vehicle manufacturer's electrical ignition system; and remote-control means for remotely controlling the security system, which remote-control means is resistant to scanning-type interference, and wherein the remote-control means further comprises: a receiving means for receiving radio control signals, and a transmitting means for transmitting a multiplicity of radio control signals, wherein said transmitting means further comprises at least: signals for changing the sensitivity of the at least one sensing means, signals for activating and deactivating the electronic means, and signals for immediate activation of the warning means.

8. The device of claim 7 wherein the connective means comprises conductive wire with a layer of insulation disposed thereon wherein the insulation is black.

9. The security system of claim 7, wherein the motor vehicle is a Harley-Davidson motorcycle and the connective means is manufactured to fit the manufacturer's original factory wiring system for a Harley-Davidson motorcycle.

10. The security system of claim 7, wherein the electronic means deactivates the warning means and the immobilization means thirty seconds after activating them.

11. The security system of claim 7, wherein the warning means comprises a small siren capable of producing a warning sound, with sound levels in excess of 100 decibels.

12. The security system of claim 7, wherein the warning means is selected from among the group comprising:
- at least one audible warning comprising a small siren that produces a warning sound, in excess of 100 decibels, and can be installed within the motor vehicle in locations difficult to access, from which the siren is difficult to remove;
- at least one visual warning means comprising a bright flashing light; and
- a remote warning means, comprising a pager that upon activation, telephones a message to the owner of the motor vehicle.

13. The security system of claim 7, further comprising:
- a source of electric power having a positive terminal and a negative terminal;
- a positive connective means electrically coupled to a positive immobilization circuit, connecting the positive terminal to the positive side of the ignition control module;
- a negative connective means electrically coupled to a negative immobilization circuit, connecting the negative terminal to the negative side of the ignition coil;
- said positive immobilization circuit electrically coupled to the electronic means and to the positive connective means, wherein the positive immobilization circuit is activated to disconnect the positive connective means from the positive side of the ignition control module when the electronic means receives the electronic sensor signals from the at least one sensing means;
- said negative immobilization circuit electrically coupled to the electronic means and to the negative connective means, wherein the negative immobilization circuit is activated to connect the negative connective means to the negative side of the ignition coil when the electronic means receives the electronic sensor signals from the at least one sensing means; and
- connective means that electrically couples: the at least one sensing means to the electronic means, the electronic means to the warning means, the electronic means to the immobilization means, the electronic means to the motor vehicle manufacturer's electrical ignition system, the positive terminal to the positive side of the ignition control module, and the negative terminal to the negative side of the ignition coil.

14. An anti-theft device for a motor vehicle having a manufacturer's electrical ignition system, which anti-theft device comprises:
- electronic means for controlling the anti-theft device, wherein the electronic means is electrically coupled: to at least one sensing means, at least one audible warning means, at least one visual warning means, a remote warning means, and at least one immobilizing means, and wherein the electronic means receives electronic sensor signals from the at least one sensing means and sends electronic activation signals to the at least one audible warning means, to the at least one visual warning means, to the remote warning means, and to the immobilizing means;
- potting means for excluding moisture, heat and vibration from the electronic means, wherein the potting means is disposed upon the electronic means;
- said at least one sensing means comprising means for detecting tampering with the motor vehicle, wherein the at least one sensing means is electrically coupled to the electronic means, wherein the at least one sensing means upon sensing tampering with the motor vehicle provides said electronic sensor signals to the electronic means, and wherein the at least one sensing means adjusts its sensitivity to security risks in response to a radio control signal transmitted from a remote control means;
- said at least one audible warning means, electrically coupled to the electronic means, activated by the electronic means when the electronic means receives the electronic signal, which audible warning means comprises a small siren capable of producing an extremely warning sound, which warning means is small enough to be installed in inaccessible locations within the motor vehicle;
- said at least one visual warning means, electrically coupled to the electronic means, activated by the electronic means when the electronic means receives the electronic signal, which visual warning means comprises a bright flashing light;
- said remote warning means, electrically coupled to the electronic means, activated by the electronic means when the electronic means receives the electronic signal, which remote warning means comprises a pager that upon activation automatically telephones a message to the owner of the motor vehicle;
- said at least one immobilizing means, electrically coupled to the electronic means, activated by the electronic means when the electronic means receives the electronic signal;
- connective means that electrically couples: the at least one sensing means to the electronic means, the electronic means to the warning means, the electronic means to the immobilization means, and the electronic means to the manufacturer's electrical ignition system, wherein the connective means plugs directly into the manufacturer's electrical ignition system;
- remote-control means for remotely controlling the anti-theft device, which remote-control means is resistant to scanning-type interference, and wherein the remote-control means further comprises: a receiving means for receiving radio control signals, and a transmitting means for transmitting a multiplicity of radio control signals, wherein said transmitting means further comprises at least: signals for changing the sensitivity of the at least one sensing means, signals for activating and deactivating the electronic means, and signals for immediate activation of the warning means.

15. The anti-theft device of claim 14 wherein the connective means comprises conductive wire with a layer of insulation disposed thereon wherein the insulation is black.

16. The anti-theft device of claim 14 wherein the motor vehicle is a Harley-Davidson motorcycle dating from no earlier than 1950.

17. The anti-theft device of claim 16 wherein the connective means is manufactured to fit the manufacturer's original factory wiring system for the Harley-Davidson motorcycle dating from no earlier than 1950.

18. The anti-theft device of claim 14 wherein the electronic means deactivates the warning means and the immobilization means thirty seconds after activating them.

19. The anti-theft device of claim 14 wherein the warning means comprises a small siren capable of producing a warning sound, with sound levels in excess of 100 decibels.

20. The anti-theft device of claim 14 further comprising a source of electrical power for powering the anti-theft device, which source of electrical power is electrically coupled to the electronic means.

21. A motor vehicle with an alarm, the motor vehicle having a manufacturer's wiring system, the alarm comprising:
- a source of electrical power connected electrically to electronic means, at least one sensing means, warning means and immobilizing means;
- said electronic means for controlling the device, wherein the electronic means is electrically coupled: to at least one sensing means, at least one warning means, and at least one immobilizing means, and wherein the electronic means receives electronic sensor signals from the at least one sensing means and sends electronic activation signals to the warning means and to the immobilizing means;
- potting means for excluding moisture, heat and vibration from the electronic means, wherein the potting means is disposed upon the electronic means;
- said at least one sensing means comprising means for detecting tampering with the motor vehicle, wherein the at least one sensing means is electrically coupled to the electronic means, and wherein the at least one sensing means upon sensing tampering with the motor vehicle provides said electronic sensor signals to the electronic means;
- said at least one immobilizing means for immobilizing the motor vehicle, which immobilization circuit is activated by the electronic means upon receipt of the electronic signal;
- said at least one warning means for warning of theft, electrically coupled to the electronic means and activated by the electronic means when the electronic means receives the electronic sensor signal, wherein the warning means is selected from among the group comprising:
  - at least one audible warning comprising a small siren that produces a warning sound, in excess of 100 decibels, and can be installed within the motorcycle in locations difficult to access, from which the siren is difficult to remove;
  - at least one visual warning means comprising at least one bright flashing light; and
  - a remote warning means, comprising a pager that upon activation, pages the owner of the motor vehicle;
- connective means that electrically couples: the at least one sensing means to the electronic means, the electronic means to the warning means, the electronic means to the immobilization means, and the electronic means to the manufacturer's electrical ignition system; and
- remote-control means for remotely controlling the alarm, which remote-control means is resistant to scanning-type interference, and wherein the remote-control means further comprises: a receiving means for receiving radio control signals, and a transmitting means for transmitting a multiplicity of radio control signals, wherein said transmitting means further comprises at least: signals for changing the sensitivity of the at least one sensing means, signals for activating and deactivating the electronic means, and signals for immediate activation of the warning means.

22. The motor vehicle with an alarm of claim 21 wherein the connective means comprises conductive wire with a layer of insulation disposed thereon wherein the insulation is black.

23. The motor vehicle with an alarm of claim 21 wherein the connective means is manufactured to fit the manufacturer's original factory wiring system for a Harley-Davidson motorcycle dating from no earlier than 1950.

24. The motor vehicle with an alarm of claim 21 wherein the electronic means deactivates the warning means and the immobilization means thirty seconds after activating them.

25. The motor vehicle with an alarm of claim 21 wherein the motor vehicle comprises a motorcycle.

26. The motor vehicle with an alarm of claim 21 wherein the source of electrical power is a battery.

* * * * *